United States Patent [19]

Litka et al.

[11] Patent Number: 5,118,288
[45] Date of Patent: Jun. 2, 1992

[54] CEMENT ADVANCED FURNACE AND PROCESS

[75] Inventors: Anthony F. Litka, Hanover, Mass.; Sidney M. Cohen, Allentown, Pa.

[73] Assignee: Gas Research Institute, Chicago, Ill.

[21] Appl. No.: 741,104

[22] Filed: Aug. 6, 1991

[51] Int. Cl.⁵ .............................................. F27D 1/08
[52] U.S. Cl. ...................................... 432/96; 432/99; 432/101; 432/102
[58] Field of Search ....................... 432/96, 97, 99–102

[56] References Cited

U.S. PATENT DOCUMENTS

| | | | |
|---|---|---|---|
| 685,336 | 10/1901 | Leroy et al. | 432/102 |
| 2,857,155 | 10/1958 | Dickey | 432/102 |
| 3,796,539 | 3/1974 | Sundermann | 432/96 |
| 4,740,157 | 4/1988 | D'Agrosa | 432/99 |
| 4,850,861 | 7/1989 | Poroshin et al. | 432/102 |
| 4,948,364 | 8/1990 | Thompson | 432/101 |
| 4,975,046 | 12/1990 | Woodroffe et al. | 432/102 |

Primary Examiner—Henry C. Yuen
Attorney, Agent, or Firm—Perman & Green

[57] ABSTRACT

A suspension shaft furnace and process for producing clinkers from discrete pellets of cement-forming batch materials, the furnace having a top vertical shaft section comprising a pellet-feeding and preheating zone, an intermediate fluidized bed section containing fuel inlet conduits for clinkering of the pellets in a fluidized bed, an air-permeable clinker-impermeable support for supporting the pellets as a fluidized bed, and a lower clinker-cooling section beneath the fluidized bed section. Clinker-discharge means permit the gravity flow of clinkers from the top of the fluidized bed down into a cooling zone in the cooling section. Air inlet means supply a combustion-supporting cooling gas up through the cooling zone, to cool the clinkers therein, and upstream through the fluidized bed section to support the combustion of fuel at the fuel inlet conduits. Heated combustion supporting gas passes upstream to the vertical shaft section to heat pellets being fed downstream and regulates their speed and dwell time prior to their entry into the fluidized bed section.

7 Claims, 1 Drawing Sheet

CEMENT ADVANCED FURNACE AND PROCESS

FIELD OF THE INVENTION

This invention relates to processes for the production of cement and more particularly to novel suspension furnaces for preheating, calcining, and clinkering of cement particles of various sizes to improve the uniformity and the quality of the product and the efficiency and energy recovery of the system.

BACKGROUND OF THE INVENTION

Cement manufacture, a complex capital intensive process, is currently conducted in kilns, commonly using coal as fuel. The process starts with mixing the raw materials, usually limestone or chalk, as a source of calcium carbonate, and clay or shale, as a source of aluminum silicates, with small quantities of other minerals added in the desired portions. The batch materials are crushed to the order of 200 mesh and mixed in a fluidization chamber for one or two days. The conventional technique of pyroprocessing cement clinker is to heat the mixed batch materials in a suspension preheater or precalciner In the process, calcium carbonate calcines to calcium oxide, and the exit temperature of the batch materials from the precalciner is approximately 900° C. The batch materials then go to the kiln in which they are slowly heated to the clinkering temperature of approximately 1300° C., at which temperature the clinker forms. The clinker, which is semi-melted and agglomerated or fused into rocks of several centimeters in size during the exothermic clinkering reaction, is then cooled in a clinker cooler. The clinker is then mixed with gypsum, fused to control final cement setting time, and crushed to about 325 mesh to form a powdered cement composition.

In the past, cement plants were principally natural gas fired. However, over the last 30 years or so many producers have used coal as a fuel because of its lower cost and because the ash and sulfur dioxide from coal burning can enter the cement batch materials without causing any damage to the product quality. For this reason coal burning does not cause much pollution. The only problems caused by coal burning are maintenance problems and the formation of alkali sulfates which are unacceptable in the clinker. To maintain alkali sulfate concentration within acceptable limits, part of the hot gas is bypassed at a location where the alkali sulfates are in vapor phase.

Reference is made to U.S. Pat. No. 3,469,828 for its disclosure of the use of inclined rotary kiln furnaces for calcining and clinkering of cement, and for modifying conventional rotary kiln furnaces in order to overcome some of the problems resulting therefrom. However inclined rotary kiln furnaces have inherent disadvantages for cement manufacture. The heat introduced to the rotary kiln produces an uneven temperature in the rotating kiln since the heat produces a higher temperature at the upper wall surface as the particulates travel down the lower wall surface of the rotating kiln. This can result in burning of the particulates as the overheated wall surface rotates into contact with the particulates. Even if the temperature is closely controlled to prevent burning, a large percentage of cement particles melt during the clinkering stage of passage through the rotary kiln since clinkering is an exothermic reaction. The temperature in the kiln must be high enough to initiate clinkering, and cannot be sufficiently reduced in the rotary kiln to prevent melting, agglomeration, wall-adhesion and other related problems.

References is also made to U.S. Pat. No. 3,692,285 for its disclosure of a vertical calcining furnace for drying and hardening iron ore pellets which are fed therethrough from a packed bed supply hopper in a zig-zag direction over the surfaces of ceramic balls and through preheating, indurating and cooling zones. The particles flow as a packed mass supported by the ceramic balls, and cooling air is directed upwardly through the beds of ceramic balls to cool the iron ore pellets prior to discharge. Such an apparatus is not suitable for clinkering cement since the particles are supported and packed together during heating, which will clog the apparatus if the particles are melted or agglomerated. Also the particles are unevenly heated and unevenly cooled in such an apparatus, which is unsatisfactory in the case of good quality cement compositions.

According to another prior-known process, disclosed in U.S. Pat. No. 4,002,422, a vertical shaft furnace is used for the heat reduction of particulate iron oxide material which is fed into the top thereof from a packed bed. Hot processing gas is introduced at an intermediate location to heat the bed of particulate material in an upper heat treatment zone as the particles fall therethrough to reduce the iron oxide to metallic iron. Cold processing gas is introduced radially-downwardly at an intermediate buffer zone to become heated by the iron particles falling therethrough for heat recovery purposes, the heated "cold" processing gas flowing upwardly to heat the incoming iron oxide particles in the same manner as the hot processing gas. Finally the falling iron particles pass through a lower converging cooling zone and exit onto an exterior conveyor. Such an apparatus is unsatisfactory for the preparation of cement clinkers since cement particles will melt and fuse or agglomerate if they are present in a packed bed at the top of a vertical shaft furnace; the exothermic clinkering reaction will be completed and will cause melting and agglomeration of the cement particles in the packed bed and/or in the upper heating zone of the furnace, and cooling of the agglomerates in the buffer zone or lower cooling zone will not restore the particles to their original dimensions. Also the particles are permitted to flow freely, under the effects of gravity, so that there is no way to adjust the residence time of the particles within zones of the furnace which may have different temperatures.

Reference is made to U.S. Pat. Nos. 4,584,022 and 4,595,416 which disclose fluidized bed cement clinkering methods and furnaces including a reactor furnace having a fluidized bed for receiving and clinkering therein a supply of sized pellets of feed material comprising cement-forming raw materials and carbon fuel. The feed material is combusted in the fluidized bed by additional fuel injected thereinto in the presence of fluidizing air forced up through a permeable support. Clinkered cement particles are discharged by gravity from the top of the fluidized bed into an overflow conduit to an outboard cooling tank containing a heat-exchanger for indirect cooling of the clinkers.

In the fluidized bed reactors of these patents the feed material is not suspended or heated substantially prior to entering the fluidized bed so that little or no calcining occurs outside the bed. Also the cooling of the clinkers occurs outside the furnace and the heat is not recovered for use in the calcining and clinkering reactions. Finally, the requirement of an outboard clinker-cooling tank increases the cost and size of the equipment.

Finally, reference is made to commonly-assigned U.S. Pat. No. 4,975,046 which discloses a furnace and processes for producing discrete clinkered cement pellets in which the batch materials are calcined, partially clinkered, and collected on a porous receiving base for completion of the clinkering reaction thereon while forcing cooling air upwardly therethrough to prevent agglomeration. The clinkered pellets are withdrawn from the bottom of the porous base at a rate which permits the pellets to complete clinkering between the time they enter the top of the bed and are withdrawn from the bottom thereof.

SUMMARY OF THE INVENTION

The present invention relates to a novel efficient process for preheating, calcining and clinkering raw cement-forming compositions to produce cement and to a novel vertical suspension furnace for carrying out said process in which particulate cement-forming materials are introduced at a controlled rate at the top of the vertical suspension furnace for controlled gravity migration through an upper pre-heating zone and an intermediate calcining zone to a heated fluidized bed in which they are turbulently suspended and heated to their clinkering temperature while being maintained in motion to prevent agglomeration. Thereafter the densified clinkered particles settle into the fluidized bed, overflow into a gravity withdrawal conduit and are withdrawn to a lower static cooling zone adjacent and spaced above the bottom of the furnace. Cooling air is continuously passed up through the clinkers, for cooling purposes. and up through the fluidized bed to support the combustion of fuel jets therein and up through the vertical suspension shaft to the preheating zone to heat and control the gravity migration of the pellets down to the fluidized bed. The heated pellets are entrained on the fluidized bed for a residence time of up to a few hours to complete the calcining and clinkering processes, and are intermittently discharged from the top of the fluidized bed into the static cooling zone, from which the cooled clinkers eventually are removed. The relatively small clinker size is suitable for final grinding. The cooling air, introduced through the cooling zone, is forced up through the fluidized bed and vertical shaft at a velocity which regulates the downward gravity-migration rate of the particulates to a predetermined desired velocity, whereby the brief dwell time of the particles through the preheating zone can be regulated to assure at least the initiation of calcining by the time that the particulates become suspended in the fluidized bed.

According to a preferred embodiment, the vertical suspension furnace comprises an interior cement shaft consisting of one or a plurality of hollow, vertical shaft modules, segments or conduits which taper or are stepped downwardly and outwardly from a narrow or restricted upper particle inlet zone diameter, such as about 50 cm (20 inches), to an enlarged particle outlet zone diameter, such as about 58cm (23 inches). Combustion fuel such as natural gas or oil is fed directly into the base of the fluidized bed, for combustion therein, while a combustion-supporting gas such as air is forced upwardly through the static cooling zone and the base of the fluidized bed, and through the suspension shaft to support the gas combustion and to regulate the rate at which the particles fall through the shaft or shaft modules and thereby control the dwell time of the particles within the preheating and drying zone. This enables heating of the falling particles to a predetermined calcining temperature of about 900° C. within the vertical shaft, below the clinkering temperature. The apparatus or furnace includes, within the fluidized bed zone, burner means which heat the calcined particles to their exothermic clinkering temperature while they are in constant motion, and means for discharging the clinkered particles from the top of the fluidized bed and conveying them to a lower static cooling zone immediately below the burner means of the fluidized bed, for receiving the clinkered particles for cooling therein. The combustion-supporting gases for the fluidized bed are introduced in cool condition upwardly through the porous bed of the static cooling zone, including the clinkered particles thereon, as a heat exchange medium which extracts the heat from the clinkered cement particles thereon, and supplies combustion air to the burner means of the fluidized bed before entry into the shaft conduit(s). This recycles the heat up through the shaft conduit(s) to assist the heating of the incoming cement particles to their calcining temperature, the rate at which the combustion-supporting or oxidizing gases are forced upwardly through the gradually restricted shaft conduit passage(s), and the temperature and density of such gases, controlling the rate at which the cement particles are buoyed against free gravity fall downwardly through said passages(s). Most preferably the incoming cement pellets have a diameter between about 0.5 and 5 mm and are continuously fed directly into the vertical shaft conduit(s) at a predetermined rate to assure uniform particle migration rates and replenishment of the contents of the fluidized bed with pellets to be clinkered after each discharge of clinkered particles to the static cooling zone.

The continuous supply of cement-forming pellets into the furnace, for deposit into the fluidized bed, results in a continuous overflow of densified clinkers from the surface of the fluidized bed into discharge conduits associated therewith. Since the clinkers are moving downstream into the lower cooling chamber, from which combustion air is flowing upstream, the clinker-discharge conduits are provided with means which permit gravity discharge of clinkers into the top of the discharge conduit while blocking the entry of air from below, such as valve means for opening of the discharge end of the conduit and closing of the top thereof, to prevent air flow therethrough while the clinkers flow into the lower cooling chamber.

An essential feature of the present invention is the use in the preheat section of a "raining bed" of small pellets which are widely separated to minimize interparticle collisions and the formation of dust. Another feature is the use of a fluidized bed to complete the calcining and clinkering reactions. The fluidized bed keeps the pellets in motion during processing, thereby preventing agglomeration and fusion while promoting contact between pellets, which promotes product chemical uniformity. These features differentiate the present invention from the prior known cement-making shaft furnaces and processes.

DETAILED DESCRIPTION OF THE INVENTION

Figure 1:
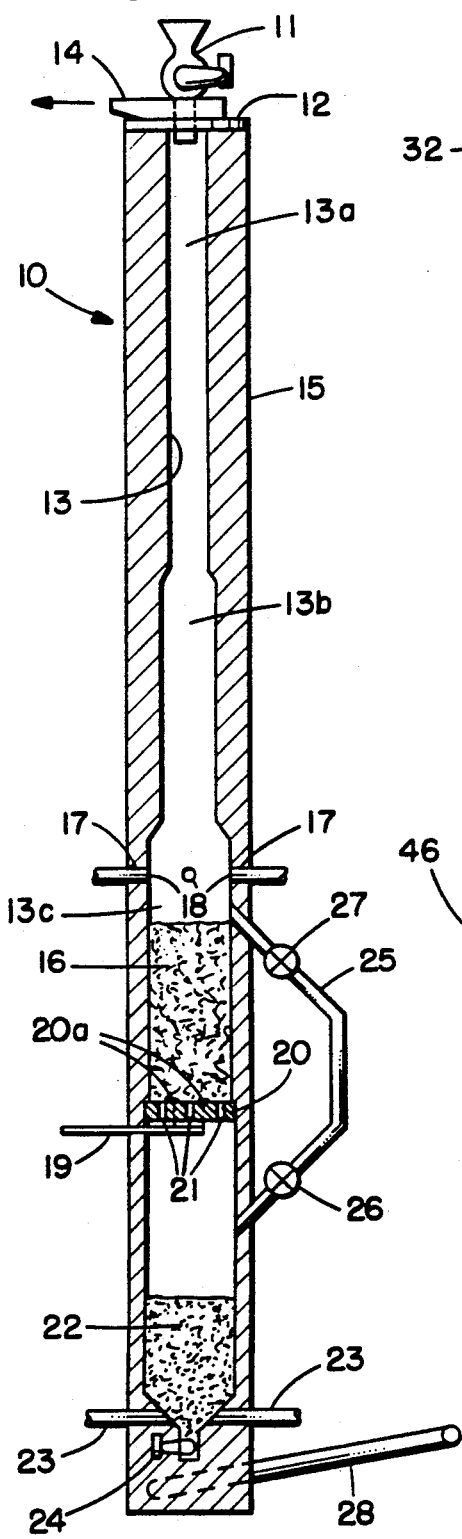
FIGS. 1 and 2 are sectional views of cement shaft suspension furnaces according to different embodiments of the present invention.

The present invention is directed to a vertical suspension furnace for synthesizing cement clinker from pelletized batch material wherein the pellets are fed into the vertical shaft(s) at the top of the furnace, fuel such as gas is fired at one or more immediate locations along the length of the furnace shaft(s) and at the base of a fluidized bed, above and in air-communication with a lower static cooling zone, and combustion-supporting gas such as air is introduced up through the cooling zone at the bottom of the furnace and up through the vertical shaft to heat and control the speed of the falling pellets. The falling pellets heat up to calcining reaction temperature before becoming turbulently suspended at the top of the fluidized bed. The clinker formation is completed in the fluidized bed, the densified clinkers are withdrawn intermittently from the top of the fluidized bed and moved into a lower static cooling zone, and clinker cooling is accomplished by forcing cool combustion-supporting gases, such as air, up through the cooling zone and clinkers. and up into the fluidized bed to support the combustion of fuel jets within said bed.

As the pellets fall in the vertical shaft of the furnace, they are heated in an upper heating and calcining zone to the calcination temperature of about 900° C., by fuel which is injected and burned at the fluidized bed zone, to provide the energy required for calcination. The rate of energy input to that fluidized bed and the rate of combustion-supporting gases fed thereto are selected so as to limit the maximum temperature and residence time of the pellets in the fluidized bed to below the melting temperature, and so as to provide sufficient residence time of the pellets in the upper heating zone for the calcination of the pellets, or at least the initiation of calcination, before the pellets enter the fluidized bed.

After completion of calcination the pellets are heated further while moving through the fluidized bed containing a low velocity upward air flow which feeds the combustion of the fuel jets to cause all pellets to move and receive uniform heating. The pellets are heated to a clinker-initiation temperature of approximately 1300°–1400° C. and are retained within the fluidized bed for a predetermined residence time of several hours before gravity discharge to a static cooling bed at the bottom of the furnace.

Gravity discharge from the top of the fluidized bed, which may be about six feet in overall height, is the natural overflow result of the continuous addition of fresh pellets to the furnace for deposit in the fluidized bed. Clinkers are drawn down onto the fluidized bed surface as they densify and the height of the bed increases so that surface clinkers fall into the small openings to the clinker-discharge conduits for intermittant discharge into the lower cooling chamber.

Combustion-supporting cooling gas such as fresh air is introduced through the bottom of the static cooling bed. The static bed serves two purposes, namely cooling the clinkers and heating of the air as it is fed upwardly to the fuel jets in the fluidized bed zone. The air flow rate up through the static cooling bed and the height of the bed are selected so that air leaving the bed is heated and equilibrated as nearly as possible with the pellet temperature at the top of the bed for maximum efficiency. Cooled clinkers are continuously or periodically withdrawn from the bottom of the cooling bed.

A suspension furnace in accordance with the present invention has extremely high heat transfer rates between combustion gas and cement-forming materials, compared to prior art kiln systems, and this gives rise to a pyroprocessing unit which can be more compact than heretofore possible. The quality and uniformity of cement clinker particles produced from the suspension process in accordance with the present invention is better than prior known processes because individual pellets are heated more uniformly and are more resistant to fusion and agglomeration with other particles when moved through a fluidized bed during clinkering than when resting on a static surface in contact with each other. Further, the use of natural gas instead of coal results in lower maintenance problems than heretofore, and eliminates the alkali sulfate cycle necessary in prior art coal heating systems. The simple process of the present invention, compared with the large and complex prior art furnaces and processes, enables a more trouble free production system.

The present suspension shaft process introduces fuel in a fluidized bed zone, at the base of the fluidized bed and also preferably at a location spaced above the fluidized bed. The burner design, shaft shape and pellet size and flow of air and pellets are properly selected to operate in a stable regime to ensure product uniformity and to achieve high heating rates in the fluidized bed region.

According to a preferred embodiment, the requirements of high heating rates, compact unit and uniform product quality are achieved through the use of one or more vertical modules, conduits or shaft segments which fill the wide furnace shaft to provide one or a plurality of narrow vertical tapered or stepped suspension conduits which terminate at and empty into a single combusting fluidized bed. In the free fall zone of the present apparatus, pellet-pellet interactions and pellet wall interactions are minimized by maintaining large interpellet distances during heating. The uniform dispersion of pellets in the suspension shaft is achieved by gas phase turbulence. All shaft modules or conduits are designed to provide a large ratio of length to diameter. The injection of natural gas is achieved through specially designed burners located in the fluidized bed zone at the base or outlet of the shaft conduit, which results in more uniform heating. It is also necessary to select upcoming air velocity in an appropriate range to provide sufficient combustion support and residence time for the pellets in the upper heating and calcining zones and to maintain stable flow. At excessive air velocities, pellets are carried vertically upward where they may be overheated due to excessive dwell time in the calcining zone while, with low air velocities, the pellets can fall too freely causing non-uniform pellet calcining and non-uniform product quality.

When using coal, increased capital and operating costs are incurred for additional grinding and for emission control both for particulates and sulfur emissions. The finer grind is required to preclude fuel impact upon the pellets which could result in an unacceptable product. Since the ash in the fuel is vaporized during combustion, its condensation is in the submicron size requiring a more extensive bag house in lieu of an electrostatic precipitator which may be used when natural gas fuels the process. There is no sulfur attachment mechanism associated with the present suspension process since any sulfates formed are on the pellet surface and are subsequently evaporated as the pellet descends through the combustion zone, thereby forming a recycling zone with most of the sulfur escaping with the combustion gases. A scrubber would typically be required where either coal or oil fires the process.

Although problems with oils are much less in terms of ash content, emission control costs are comparable to coal since sulfur content is similar and submicron particles are generated. While this additional cost combined with the high cost per BTU for oil burners makes the use of natural gas economically more attractive, the present process and apparatus is dual fuel-capable, and light fuel oils and oil-burning nozzles can be used in place of gas and gas-burning nozzles if desired.

Referring to the drawings, FIG. 1 illustrates a single-shaft suspension furnace 10 in accordance with the invention wherein conventional pellets formed with the necessary cement raw materials are uniformly distributed and introduced via individual pellet rotary feeders 11 through the furnace wall 12 at the top of the cylindrical shaft furnace 10, directly into an upper heating section 13a of the vertical shaft conduit 13, preferably slightly downstream of the open heat exhaust manifold 14 of the conduit 13.

Figure 2:
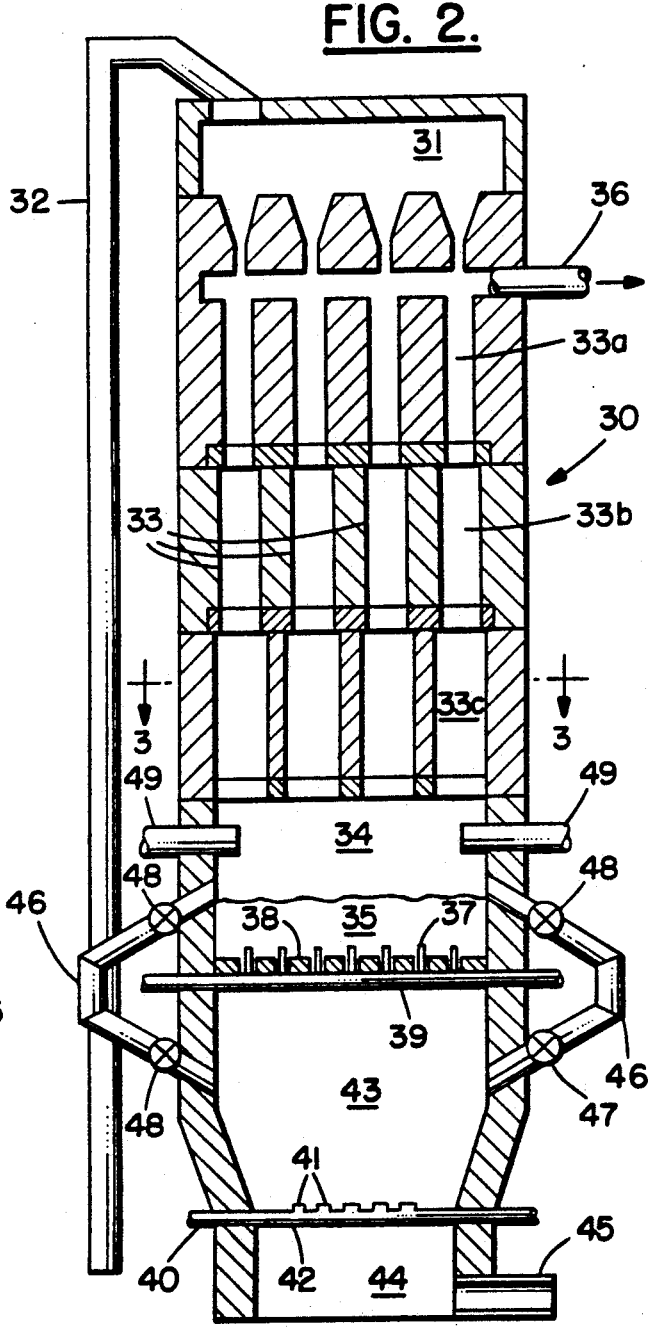

The single vertical shaft conduit 13 in the embodiment of FIG. 1 may be replaced with a greater number of vertical conduits of smaller relative diameter, depending upon the width and height of the furnace 10 so as to substantially fill the vertical furnace shaft space within the vertical furnace wall 15, as illustrated in FIG. 2. The shaft conduit 13 is a hollow, temperature-resistant tube, such as of ceramic composition, which steps (or gradually tapers) outwardly and downwardly from a more restricted, smaller-diameter, upper heat section to an intermediate-diameter calcination-initiation section 13b opening into a larger-diameter, lower fluidized bed section 13c. In the case of multiple shaft conduits, all empty into a common fluidized bed as shown by FIG. 2.

FIG. 1 illustrates supplemental combustion fuel inlet pipes 17 which deliver a uniform and variable supply of fuel, such as natural gas, through upper gas inlet nozzles 18 directly into the freeboard area of the fluidized bed section 13c, above the fluidized bed 16 therein, to supply heat to the calcination-initiation sections 13b and 13a of the shaft conduit 13, each nozzle 18 comprising a gas burner or jet at which the flammable gas burns to discharge a flame into the conduit section 13c in the area immediately above the fluidized bed 16 to generate a temperature which heats the pellets to a temperature up to about 900° C. as they calcinate and fall down to the fluidized bed 16. The heat of the combustion at nozzles 18 also radiates down to the fluidized bed 16 to help satisfy the energy requirements of the clinkering reaction being completed therein.

Spaced downwardly from the gas inlet pipes 17 in section 13c are one or more lower gas inlet pipes 19 which deliver a uniform and variable supply of the combustible gas, through spaced lower gas inlet openings 20a in a grid plate support 20 directly into the fluidized bed 16, each opening 20 comprising a gas burner nozzle or jet at which the flammable gas burns to discharge fuel which burns luminously throughout the fluidized bed 16 to heat the pellets to a temperature up to about 1300°-1400° C.

As the heated pellets move around in the fluidized bed they are heated to their clinkering temperature of about 1300°-1400° C. and remain in the fluidized bed, on average, for 1-2 hours before they pass into a lower cooling zone 22 including air inlets 23 and a clinker discharge feeder 24 to a discharge conduit 28 adjacent the base thereof. A large volume of combustion-supporting cool gas is introduced through inlets 23 to cool the clinkers in the static cooling zone 22 and is forced upwardly through air passages 21 in the grid plate support 20 to the fluidized bed section 16 to support the combustion of the gas issuing from the jets at openings 20a, and of the gas issuing from the supplemental jets at openings 18.

Clinkering of the cement particles is a chemical reaction which requires that the particles be heated to a clinker-initiation temperature of about 1300°-1400° C., after which the reaction becomes exothermic and requires no further heat input. In a relatively short time the exothermic heat normally will melt and liquify or fuse and agglomerate the pellets. However the novel furnace and process of the present invention avoids fusion and agglomeration of the pellets by producing continuous movement of the pellets during heating in the fluidized bed, and withdrawal and cooling the clinkering pellets in the combustion-supporting air to prevent runaway exothermic temperatures which otherwise can result in melting and/or fusion.

The discharge of the clinkered pellets from the fluidized bed zone 16 is regulated by the sequential opening of the discharge conduits 25, first to the fluidized bed 16 and then to the lower cooling chamber 22, by means of valves 26 and 27, in order to cause clinkered particles to exit the fluidized section 16 and enter the upper end of the discharge conduit, 25 when valve 26 is closed and valve 27 is opened, and then to flow down past the valve 26 when valve 27 is closed and valve 26 is opened, into the lower end of the discharge conduit 25 into the lower cooling zone 22 to be cooled by means of combustion supporting air. The latter is introduced through air inlets 23 from a pressurized source and is prevented from entering conduit 25 since one of the valves 26 and 27 is closed at any given time.

In the furnace of FIG. 1 the pre-clinkered pellets exit the shaft conduit section 13b into a fluidized bed 16 and are periodically discharged to the base of the furnace and deposit as clinkers on a porous cooling bed 22. The fluidized bed 16 is heated to a clinkering temperature sufficient to heat the pellets to their clinkering temperature of about 1300°-1400° C. while keeping them moving during their dwell time in passing therethrough before discharge to the porous cooling zone 22. The temperature in the fluidized bed 16 is produced by the combustion of flammable gases introduced through gas pipes 19 and burned at gas nozzles or jets 20a. FIG. 1 illustrates a single gas pipe 19 but any number of such lower gas pipes may be spaced radially around the fluidized bed 16 to produce a uniform high temperature therein.

Control of the clinkering reaction is accomplished in part by forcing a cool or cold combustion-supporting gas, such as air, at a predetermined, variable rate through the inlets 23, into the lower cooling zone 22 where it is warmed by contact with the clinker up through the passages 21 into the fluidizable bed 16 and through the clinkering pellets therein to support the combustion of the gases at openings 20a and 18. Uniform and complete clinkering takes place in the fluidized bed 16, without any agglomeration of the clinkered cement pellets. Fully-clinkered, hot pellets overflow from the top of the bed 16 into the discharge conduit 25 as new clinkering pellets are continuously introduced to the furnace from feeder 11 to resupply the fluidized bed 16.

The cooling gas, normally air, passes upwardly through the cooling bed 22, in which it becomes heated, into the fluidized bed 16, in which it supports combustion, and up through the shaft conduit sections 13b and 13a in the form of a pre-heated gas to preheat new pellets. Finally the combustion gas products are forced up through the exhaust manifold 14 of safe discharge, heat-recovery, etc.

As will be apparent to those skilled in the art, the temperatures within the heating section 13a, calcining section 13b and clinkering section 13c of the present vertical shaft furnaces can be closely regulated by adjusting the volume and/or type of combustible gas introduced through the gas inlet pipes 17 and 19. More importantly, the temperature of the pellets within these zones can be controlled by regulating the volume of combustion-supporting cooling air forced up through these zones in association with the size or weight of the pellets and their rate of introduction and withdrawal, thereby regulating the rate of fall of the pellets and their dwell time under the influence of the temperatures present within the various zones. The downwardly gradually-diverging or stepped diameter of the shaft conduit(s) 13 permits the combustion gases to rise at a gradually-faster rate to counteract the otherwise free gravity fall of the pellets, whereby the rate of fall of the pellets can be decreased (or residence time increased) by increasing the volume of cooling air which is introduced, to support or float the pellets against free fall, and vice versa.

Figure 3:
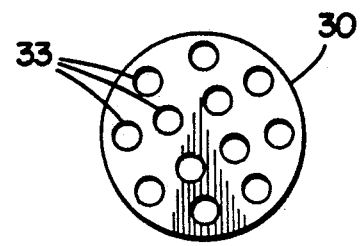
FIG. 3 is a view taken along the line 3—3 of FIG. 2.

The present furnace shaft may, for example, have a diameter of about 9 meters and a height of about 48 meters or more to produce for example, a nominal capacity of about 100 metric tons per hour of clinker or about 900,000 short tons per year of cement at about 90% capacity. The pellets preferably have a diameter between abut 0.5 and 5.0 millimeters. FIGS. 2 and 3 illustrate a multi shaft furnace according to another embodiment of the present invention.

The suspension shaft furnace 30 of FIG. 2 comprises an upper feed bin section 31 to which a supply of cement-forming pellets is fed through a supply conduit 32. The floor of the feed bin 31 opens into a plurality of vertical shaft modules 33 each of which increases in diameter from an upper heating zone 33a to intermediate calcining zone 33b and c and opens into a clinkering zone 34 containing a fluidized bed 35.

In the embodiment illustrated by FIGS. 2 and 3 the suspension shaft comprises twelve tubular shaft modules 33 of heat-resistant composition. However, larger or smaller number of modules may be incorporated. The use of several smaller-diameter shaft modules, rather than a single large-diameter shaft, permits the suspension and heating of the pellets to be controlled more uniformly as they gravity-fall against the force of the heated combusting air moving up through the shaft modules 33 to a release conduit 36.

The heated, calcining pellets fall from each of the conduit sections 33c into the common clinkering section 34 where they become entrained or turbulently suspended in the fluidized bed 35.

The heating of the fluidized bed 35 of FIG. 2 is accomplished by a plurality of gas jets 37 present in an air-permeable grate 38 which supports the fluidized bed 35 of clinkers, the jets 37 being supplied with fuel such as natural gas through a common conduit 39. The combustion of the fuel at jets 37 is supported by a large volume of air introduced through an air conduit 40 to jets 41 present in a porous support 42 forming a clinker-cooling static bed in the lower clinker cooling section 43.

The clinkers are cooled on the static bed. The cooled clinkers migrate down into a discharge section 44 and are withdrawn through a discharge conduit 45.

As in the furnace 10 of FIG. 1, the clinkers, which become densely packed in the fluidized bed 35 and therefore would be difficult to withdraw through an opening in the support 38 at the bottom of the bed, are continuously withdrawn from the top of the bed 35 by overflow into clinker-discharge conduits 46. Conduits 46 are provided with lower valves 47 and upper valves 48 which are spaced from each other to form a temporary storage compartment which can be closed by valve 47, to prevent the entry of combustion air from the cooling zone 43, and can be closed by valve 48, to prevent the entry of clinkers from the fluidized bed 35. The valves 47 and 48 operate simultaneously and intermittently but in opposite directions, i.e., at least one of the valves 47 and 48 is closed at any given time to prevent the passage of the combustion air through the conduits 46. Thus when valves 48 are opened, clinkers overflow from the bed 35 to fill the intermediate clinker storage compartment of the conduit but are prevented by closed valves 47 from flowing into the cooling zone 43. The intermittent reverse operation of the valves opens valves 47 to permit the gravity discharge of the clinkers into the cooling zone 43 while closing values 48 to prevent air from flowing up through the conduits 46, which air flow would blow the clinkers back up into the clinkering zone 34. Thus, the clinker discharge conduits 46 and 25 of FIGS. 2 and 1 and their valve pairs 47 and 48, and 26 and 27, respectfully, function in exactly the same manner in the furnaces 30 and 10, and the intermittent operation of the valves is so frequent as to permit a substantially-continuous overflow of clinkers from the fluidized bed into the underlying cooling chamber.

Also, as on the furnace 10 of FIG. 1, the furnace 30 of FIG. 2, is provided with supplemental jets 49 which introduce a continuous supply of fuel such as natural gas for combustion in the freeboard area of the clinkering section 34 above the fluidized bed 35. The combustion of jets 49 is supported by the large volume of air forced up through the static clinker cooling zone 43 from air conduit 40 to cool the clinkers by heat exchange, and forced up through the fluidized bed 35 to maintain turbulence therein. Such air is further heated by the ignited gas jets 49 and is forced upstream through the conduit modules 33c at a predetermined rate to control the temperature and dwell time of new cement forming pellets falling downstream from the feed bin 31. The volume of air supplied through the air conduits 40 of FIG. 2 or 23 of FIG. 1 is substantially greater than the total volume of fuel gas supplied through gas conduits 39 and 49 of FIG. 2, or 17 and 19 of FIG. 1, e.g., about 9 times the volume and 17 times the mass of fuel gas in the case of methane, in order to produce preferred stiochiometric combustion.

The height of the present furnace may be varied to provide the desired pellet processing time. The pellets should also be formed to resist decrepitation due to the heating and cooling cycles to which they are exposed so that they do not degenerate into smaller particles. Further, since uniformity of pellet and gas flows in the horizontal plane is desired, non-uniformity of air and gas injection is to be avoided. Thus, injection burners should be used which maintain uniform heat release over any cross section.

The present invention has extremely fast heat transfer rates to the pellets and permits the use of a very compact furnace. The process permits initiation of the clinkering process in a period of about 5 seconds and completion of the clinkering process in several hours. The simplicity of the process results in low downtime, low maintenance and provides a higher quality of clinker.

The various features and advantages of the invention are thought to be clear from the foregoing description. Various other features and advantages not specifically enumerated will undoubtedly occur to those versed in the art, as likewise will many variations and modifications of the preferred embodiment illustrated, all of which may be achieved without departing from the spirit and scope of the invention as defined by the following claims.

We claim:

1. A suspension shaft furnace for producing discrete cement clinkers from discrete pellets of cement-forming batch materials which are gravity-migrated therethrough, comprising a vertical furnace housing enclosing a top pellet-feeding and preheating zone comprising an elongate vertical shaft section opening into an intermediate fluidized bed section comprising fuel inlet conduits for supplying a fuel for combustion and initiation of calcination of said pellets, an air-permeable clinker-impermeable support for receiving and supporting a supply of said pellets as a fluidized bed within said fluidized bed section during the completion of clinkering thereof; a lower clinker-cooling section beneath said fluidized bed section; clinker-discharge means communicating between said fluidized bed section and said cooling section for the gravity flow of clinkers from the top of the fluidized bed down into a cooling zone within said cooling section; and air inlet means for supplying a combustion-supporting cooling gas through said cooling zone, to cool the clinkers therein, and to pass upstream through said fluidized bed to support the combustion of fuel at said fuel inlet conduits, and to pass upstream through said vertical shaft section to preheat pellets which gravity migrate downstream therethrough and regulate their speed and dwell time within said section prior to their entry into said fluidized bed section.

2. A suspension furnace according to claim 1 comprising means for regulating the upstream force of said combustion-supporting gas to provide a suspension means to regulate the downstream gravity-migration of said pellets through said vertical shaft section to provide dwell times therewithin to heat the pellets to predetermined desired heating, calcining and clinker-initiation temperatures.

3. A suspension furnace according to claim 2 in which said suspension means further includes upwardly-converging walls in said vertical suspension shaft section which cause changes in the upstream force of said combustion supporting gas thereby controlling the downstream gravity-migration of said pellets in the said top pellet-feeding zone and, in the said intermediate fluidized bed zone.

4. A suspension furnace according to claim 3 in which said vertical shaft section comprises a plurality of upwardly-converging vertical cement shaft conduits, each of which includes a top pellet-feeding zone and a downstream outlet zone immediately upstream of said fluidized bed zone for discharging preheated cement-forming pellets into said fluidized bed.

5. A suspension furnace according to claim 1 in which said fluidized bed section contains spaced inlet means for supplying fuel directly into said fluidized bed and also upstream thereof, adjacent the downstream end of said vertical shaft section.

6. A suspension furnace according to claim 1 in which said pellets of cement-forming batch materials have a diameter between about 0.5 and 5.0 millimeters.

7. A suspension furnace according to claim 1 in which said clinker discharge means comprises a conduit having an intermediate compartment, first valve means for intermittently opening and closing said compartment to said fluidized bed section, and second valve means for intermittently closing and opening said compartment to said cooling section, and means for operating each of said valves to close direct communication between said cooling section and said fluidized bed section while said intermediate compartment is alternately receiving clinkers and discharging clinkers.

* * * * *